US007240710B2

United States Patent
Hrycyk et al.

(10) Patent No.: US 7,240,710 B2
(45) Date of Patent: Jul. 10, 2007

(54) CABLE BEAD AND METHOD OF MANUFACTURE

(75) Inventors: Richard Nicholas Hrycyk, Canton, OH (US); Donald Chester Kubinski, Medina, OH (US); Warren Paul Ripple, North Canton, OH (US)

(73) Assignee: The Goodyear Tire & Rubber Co., Akron, OH (US)

( * ) Notice: Subject to any disclaimer, the term of this patent is extended or adjusted under 35 U.S.C. 154(b) by 242 days.

(21) Appl. No.: 10/348,260

(22) Filed: Jan. 22, 2003

(65) Prior Publication Data

US 2003/0145936 A1    Aug. 7, 2003

Related U.S. Application Data

(63) Continuation-in-part of application No. 09/716,358, filed on Nov. 20, 2000, now abandoned.

(51) Int. Cl.
*B29D 30/48* (2006.01)
*B60C 15/04* (2006.01)

(52) U.S. Cl. .................. 152/540; 156/132; 156/136; 245/1.5

(58) Field of Classification Search ........... 156/136, 156/422, 460, 131–133, 135; 152/540, 542; 245/1.5
See application file for complete search history.

(56) References Cited

U.S. PATENT DOCUMENTS

| | | | |
|---|---|---|---|
| 1,270,053 A | 6/1918 | Ream | |
| 1,294,160 A | 2/1919 | Pratt | |
| 1,437,013 A | 11/1922 | Pratt | |
| 1,491,626 A | 4/1924 | Pratt | |
| 1,715,302 A | 5/1929 | Michelin | |
| 1,763,179 A | 6/1930 | Pierce | |
| 1,871,438 A * | 8/1932 | Abbott, Jr. | 156/131 |
| 1,915,668 A * | 6/1933 | Hoover | 156/131 |
| 1,943,273 A | 1/1934 | Lerch | |
| 2,703,128 A * | 3/1955 | Burgess | 152/557 |
| 3,106,952 A | 10/1963 | Rudder | |
| 3,406,733 A | 10/1968 | Boileau | |
| 3,654,007 A * | 4/1972 | Winstanley et al. | 156/132 |
| 3,861,442 A | 1/1975 | Bertrand | |
| 4,067,375 A | 1/1978 | Lejeune | |
| 4,202,717 A | 5/1980 | Seiberling | |
| 4,236,883 A | 12/1980 | Turk et al. | |
| 4,320,791 A | 3/1982 | Fujii et al. | |
| 4,450,025 A * | 5/1984 | Henley | 156/132 |
| 4,561,919 A | 12/1985 | Forsyth | |
| 4,938,437 A | 7/1990 | Rausch | |

(Continued)

FOREIGN PATENT DOCUMENTS

EP    0433917    6/1991

(Continued)

*Primary Examiner*—Geoffrey L. Knable
(74) *Attorney, Agent, or Firm*—Howard M. Cohn

(57) ABSTRACT

The present invention relates to a cable bead, the method of constructing the cable bead and a tire constructed by a process incorporating the cable bead wherein the cable bead is formed with a bead core wound from a single filament of bead core wire having a rubber or elastomeric coating, first annular wrap of bead wrapping wire helically wound around the bead core, and a coating of lubricant or fatty acid disposed about the bead core.

20 Claims, 7 Drawing Sheets

U.S. PATENT DOCUMENTS

| | | |
|---|---|---|
| 4,967,821 A | 11/1990 | Holroyd et al. |
| 4,998,875 A | 3/1991 | Starkey |
| 5,099,902 A | 3/1992 | Shurman |
| 5,129,802 A | 7/1992 | Sergel et al. |
| 5,173,341 A | 12/1992 | Shiratori et al. |
| 5,176,767 A | 1/1993 | Hoshino et al. |
| 5,176,951 A | 1/1993 | Rudo |
| 5,201,972 A * | 4/1993 | Brettschneider et al. .... 152/540 |
| 5,215,613 A | 6/1993 | Shemenski et al. |
| 5,261,473 A | 11/1993 | Penant |
| 5,445,202 A | 8/1995 | Nguyen et al. |
| 5,603,797 A | 2/1997 | Thomas et al. |
| 5,626,695 A | 5/1997 | Yamamoto |
| 5,651,849 A | 7/1997 | Pizzorno |
| 5,749,980 A | 5/1998 | Izuchi et al. |
| 5,772,808 A | 6/1998 | Kuriya |
| 5,787,950 A | 8/1998 | Muhlhoff et al. |
| 5,820,717 A | 10/1998 | Sigenthaler |
| 5,882,458 A | 3/1999 | Kolb et al. |
| 5,971,047 A | 10/1999 | Drieux et al. |
| 5,979,528 A | 11/1999 | Miyazono |
| 6,092,575 A | 7/2000 | Drieux et al. |
| 6,105,646 A | 8/2000 | Sigenthaler |
| 6,238,193 B1 | 5/2001 | Bosseaux |

FOREIGN PATENT DOCUMENTS

| | | |
|---|---|---|
| EP | 0655354 | 5/1995 |
| EP | 0707986 | 4/1996 |
| FR | 1260138 | 3/1961 |
| GB | 189429 | 10/1922 |
| GB | A-2104461 | 8/1982 |
| JP | 5150106 | 5/1976 |
| JP | 355001201 A | 1/1980 |
| JP | 405330321 A | 12/1993 |
| JP | 408295108 A | 11/1996 |
| JP | 411189018 A | 7/1999 |
| JP | 2000016034 A | 1/2000 |

* cited by examiner

CABLE BEAD AND METHOD OF MANUFACTURE

RELATED APPLICATIONS

This application is a continuation-in-part application of U.S. patent application Ser. No. 09/716,358, now abandoned, having a filing date of Nov. 20, 2000 and a common assignee with the present invention.

TECHNICAL FIELD

The present invention generally relates to tire beads and their methods of manufacture, and more particularly, to cable and single wire beads and their method of manufacture.

BACKGROUND OF THE INVENTION

A tire bead is that part of a tire which has a function of locating and fixing textile or steel cords of a carcass ply, determining the internal periphery of the tire, and anchoring the tire onto a wheel rim. The tire bead is essentially an annular, tensile member or inextensible hoop. Every tire has at least two tire beads which are located within the rubber or elastomeric matrix that makes up the radially inner-most circumference on each side of the tire. There are three primary conventional categories of tire beads, they are strap beads, single wire beads and cable beads.

Strap Beads

An example of a strap bead is disclosed in European Patent Application No. 655,354 wherein a bead core is constructed by winding a strip of wire-rubber matrix made of a row of several wires buried in rubber, as shown in FIG. 1 herein. The rubber keeps the bead together and prevents fretting of the wire into adjacent components of the tire. A strap bead is easy and economical to manufacture. There are, however, some drawbacks to strap beads. First, the inner and outer ends of the strap overlap and are spliced, wrapped or stapled together. The weakest region of this type of bead is at the overlap of the strap ends. Also, in the manufacture of a pneumatic tire incorporating strap beads, the rows and lines of the wire-rubber matrix tend to fall in disorder during the tire building and curing steps and it can adversely affect the uniformity of the tire.

Single Wire Beads

The single wire bead is constructed by wrapping a single strand of rubber coated bead wire into a bundle or hoop of a desired cross sectional shape. The cross-sectional shape can be defined as, but not limited to, hexagonal, triangular, square or pentagonal. The number of turns that the bead wire is wound depends upon the strength and/or cross-sectional area of the tire bead desired. For example, as shown in FIG. 2 herein, a single rubber-coated bead wire is wrapped nineteen (19) times into a cylindrical bundle or hoop that forms an hexagonal shaped bead. Note that the wraps begin on the inner row, left-hand corner, move to the right, then up and back toward the left, and then up and to the right. The free ends of the bead wire can be secured by a number of techniques including pushing them into the bundle, and/or stapling or taping them to the bundle. A single wire bead is the strongest of the conventional prior art beads described herein. The deficiencies of a single wire bead are a) since the single wire bead is wound of a single wire, the production time is often longer and therefore the single wire beads are generally more expensive to manufacture; and b) also, the free ends of the wound bead wire have a spring-back nature and sometimes come loose from the bundle causing tire misalignments, a protuberance from the tire, and/or some tire imbalance.

Cable Beads

A conventional cable bead typically consists of a core hoop formed of a single wire having its ends typically welded together. Then a cable, consisting of one or more filaments of wire, is helically wound around the core hoop. Next, one free end of each filament is connected to the opposite free end, typically by inserting the free ends into a ferrule and crimping the ferrule. The deficiencies in this cable bead construction generally include a) the core tending to break at the weld; b) the cable filament wire tending to break at the ferrule causing the free ends of the wound cable wire which have a spring-back nature to sometimes come loose from the bundle causing tire misalignments, a protuberance from the tire, and/or some tire imbalance. An example of this type of cable bead construction is set forth in G.B. 189,429 and U.S. Pat. No. 1,491,626.

Another prior art cable bead design, as disclosed in U.S. Pat. No. 1,715,302, can be constructed of a core hoop formed of a group of wires twisted together. The ends of the wires forming the core hoop can be secured to each other, typically by welding them together. Then, a cable consisting of one or more filaments of wire is helically wound around the core hoop. The ends of each filament of the cable are connected to each other, typically by inserting them into a ferrule and crimping the ferrule to secure the ends therein. When two or more cable layers are wound about the core, they are preferably wound in opposite directions to each other. The deficiencies in this cable bead construction include: a) the added time and expensive due to the core being formed of a group of twisted wires; and b) the cable filament(s) tending to break at the ferrule causing the free ends of the wound cable wire which have a spring-back nature to sometimes come loose from the bundle causing tire misalignments, a protuberance from the tire, and/or some tire imbalance.

Still another prior art cable bead design, as disclosed in U.S. Pat. No. 1,437,013 ('013), can be constructed of a core that "consists of three convolutions of wire laid side by side in such a relation as to form a triangular cross section the arrangement being such that two of the convolutions lie side by side and the third lies on the outer side of these two convolutions directly over their adjacent sides. The core so formed is of triangular cross section with one of its sides toward the inner side of the core and the inner side of the completed grommet and the apex of the triangle toward the outer side of the grommet" (page 1, lines 39-51). The three convolutions . . . are preferably formed from a continuous piece of wire . . . " (page 1, lines 100-102). The ends of the wire forming the core can be secured to each other, "as by welding them together" (page 1, lines 108-109). Then, "a plurality of convolutions of spirals are wound upon the core so formed with the spirals of several convolutions lying side by side and forming a complete layer or casing." (page 1, lines 52-56). "The end of the wire forming the surrounding casing may be secured in position in any suitable manner" (page 2, lines 12-14). When the surrounding casing of spirally formed wire has been completed, the grommet is substantially in the form indicated in FIG. 2 of the '013 patent, the spirals of the casing being arranged approximately in a circle about the triangular core.

The grommet so formed as an intermediate product of construction is then subjected to heavy pressure to expand it to the desired size. While so expanding the grommet, the casing of spirals assumes a configuration more or less approximating the cross-sectional shape of the core so that the completed grommet is substantially triangular in cross-section. The relation of the core wires and the wires of the spiral casing after the grommet has been so expanded is indicated in FIG. 3.

During the intermediate stage of construction, when the grommet is in the form as shown in FIG. 2, the spirals of the casing are arranged approximately in a circle about the triangular core. However, after the grommet has been formed into an intermediate article of manufacture, as previously discussed, the grommet is preferably stretched to enlarge it to the precise diameter desired for the completed grommet. The disclosure of expanding the grommet by heavy pressure from the size shown in FIG. 2 of the '013 patent up to the desired size as shown in FIG. 3 of that patent is not readily understandable. While the multiple convolutions of single wound wire forming the triangular core of the bead must have enough flexibility that the bead portions of the tire can be mounted on a rim, they must concurrently be stiff and strong enough that tire remains mounted on the rim during the stresses generated under normal operating conditions. Moreover, it seems likely that the wound wire would be stretched beyond its elastic limit and therefore be unable to return to its design shape. Therefore, it seems unlikely that the core would be unable to stretch from the diameter shown in FIG. 2 to the diameter shown in FIG. 3 while retaining its functional requirements due to the strength requirements of the grommet. This ability to stretch is even less likely in the bead design where the ends of the wire forming the core are joined together, as by welding. With this design, the core would have the tendency to break at the weld.

It is further not understood from the disclosure of the '013 patent how the surrounding casing or casings of spirally wound wires would shift from their initial circular configuration (shown in FIG. 2 of the '013 patent) to a triangular shape (shown in FIG. 3 of the '013 patent) corresponding to that of the enclosed triangular shaped core (a triangular shape with one of its sides toward the center of the grommet and its apex directed outwardly of the grommet). The spirally wound wire(s) are wound about the core so as to cross all of the core wires as they spiral along the length of the core from one end to the other. When a device (not shown) is inserted into the grommet to stretch it outwardly, the device would be forced to press the casing wires at spaced locations against the core wires which would in turn cause the casing wires to resist being stretched. And even if they could stretch, it is not understandable how they could stretch to a triangular shape since they would not be free to stretch evenly.

Another apparent structural contradiction in the '013 patent is that, similar to the triangular core, the convolutions of wound wire forming the casing of the bead must have enough flexibility that the bead portions of the tire can be mounted on a rim. They must concurrently be stiff and strong enough that tire remains mounted on the rim during the stresses generated under normal operating conditions. Moreover, it seems likely that the wound wire of the casing would be stretched beyond its elastic limit and therefore be unable to return to its design shape. Therefore, it seems unlikely that the casing would be able to stretch from the diameter shown in FIG. 2 of the '013 patent to the diameter shown in FIG. 3 of that patent while retaining its functional requirements due to the strength and stiffness requirements of the grommet needed for the bead to function properly in a tire.

Regarding the functionality of conventional cable beads, it is believed that the core of the prior art cable beads were primarily used as a mandrel to wrap the cabling around. When a prior art cable bead of the types described herein before is incorporated into a green tire carcass, the cable does not stick or attach itself to the green rubber of the ply when the ply ends are wrapped around the cable beads and pressed against the main body of the ply on the first stage tire building drum. Then, when the tire carcass is shaped into a toroidal cross section on the first stage tire building drum, the material around the cable tends to slip about the cable bead so that uniformity problems possibly caused by the bead being twisted (such as single wire or strap beads) are reduced. Then, after the tire is cured, the core is no longer needed and the strength of the bead is primarily derived from the cabling. The cabling of the prior art cable beads, while providing the primary strength of the bead, is also generally flexible. The flexibility of the prior art cable beads is advantageous in that the tire is easier to mount on a wheel. However, the flexibility has an important disadvantage. That is, the flexible nature of the prior art cable beads also causes them to more easily unseat from a wheel, especially during adverse load conditions such as with deflated or under-pressurized tires.

Another cable bead design as disclosed in Japanese Laid-Open Patent Application 55-1201 entitled BEAD WIRE discloses for example, a "composite bead wire, as shown in FIG. 4, a hard steel solid wire W14 coated with rubber coating R2 was sequentially wound in parallel so that they were in close contact with one another and stacked and wound, resulting in a formed bead wire main body with a hexagonal cross-section. With this as the cord ring, its peripheral surface was spirally wound with a hard steel wire W15 and the entire peripheral surface of the core ring was surrounded, resulting in a bead wire characterized by a circular cross-section." (See P. 15 of translation). In another embodiment, as shown in FIG. 5 of the 55-1201 Application, "a rubber coating R3a is applied to a single hard steel wire W16 using a rubber extruder, and that hard steel wire W16 is wound three times in parallel on a winder former to form a first layer." Using additional winders can be layered to form "a bead wire main body 1 whose cross-section shape is hexagonal."

"Next, a rubber coating R4 is applied to a hard steel wire W17 using a rubber extruder to make a rubber coated wire 2. Using the aforesaid bead wire main body 1 as a core ring, the rubber coated wire 2 is spirally wound . . . on its peripheral surface, and the entire peripheral surface of the bead wire main body 1 . . . " (See pages 15 and 16 of the translation). This patent application has a limitation in that the rubber coated wire forming the bead wire main body is in contact with the rubber coating the rubber coated wire disposed about the bead wire main body so that the surrounding wire and main bead wire have a tendency not to move with respect to each other during the manufacture of the tire prior to the molding process.

In a Japanese Laid-Open Patent Application 51-50106, there is disclosed a composite bead wire wherein a ring body B3 formed of a hard steel solid wire W11 with a rubber coating R2 has a hard steel wire W12 spirally wound about the peripheral surface at a suitable pitch. A rubber coating or a fabric coating can be applied to fill the gap between the ring body's B3 hexagonal cross-section and the circular cross-section of the peripheral spiral winding using the hard steel wire W12." This patent application can be distinguished from the present invention in that the application of a rubber coating or fabric coating between the ring body and the spiral winding would also prevent the movement of the spiral winding with respect to the ring body during the manufacture of the ring.

Thus, despite the existence of several types of beads in the prior art, there still exists a need for an improved tire bead construction that can reduce or eliminate the above-described difficulties.

SUMMARY OF THE INVENTION

In accordance with the present invention, an uncured cable bead comprises a bead core formed from a single filament of bead core wire having a coating of rubber or elastomeric material, The bead core wire is continuously wound into successive windings in a side by side relation and in successive superimposed rows of predetermined widths to form a bead core of predetermined cross-sectional shape. A coating of lubricant surrounds the bead core. A first annular wrap of a single filament of bead wrapping wire is helically wound around the coating surrounding the bead core.

Further in accordance with the present invention, the lubricant is a fatty acid, preferably a zinc stearate.

Still further in accordance with the present invention, the single filament of bead core wire has a coating of uncured rubber or uncured elastomeric material.

Further in accordance with the present invention, the bead core has a hexagonal cross-sectional shape.

Also in accordance with the present invention, the first annular wrap of bead wrapping wire is helically wound around the bead core in a first direction. The uncured cable bead further comprises a second annular wrap of bead wrapping wire being wound around the bead core and the first annular wrap of bead wrapping wire to provide a bead of predetermined size.

The second annular wrap of bead wrapping wire is helically wound around the bead core and the first annular wrap of bead wrapping wire in a second direction opposite from the first direction.

Still further in accordance with the present invention, the bead core wire has a coating selected from the group consisting of chrome, zinc, copper, bronze and brass. The bead wrapping wire can also have a coating selected from the group comprising chrome, zinc, copper, bronze and brass.

Further in accordance with the present invention, the bead core can be at least partially wrapped with a reinforced or non-reinforced material to secure the ends of the bead core wire. Also, the bead core wire and the bead wrapping wire can be of different metals and/or coated with different materials to affect the operating characteristics of the spiral hex bead.

In accordance with another embodiment of the present invention, a method of constructing a cable bead by the steps of: a) winding a single filament of bead core wire having a coating of rubber or elastomeric material into successive windings in a side by side relation and in successive superimposed rows of predetermined widths to form a bead core of predetermined cross-sectional shape; b) coating the bead core with a lubricant; and c) helically winding a first annular wrap of a single filament of bead wrapping wire in a first direction around the coating surrounding the bead core.

Further in accordance with the present invention, the step of coating the bead core with a lubricant includes coating the bead core with a fatty acid, such as a zinc stearate.

Still further in accordance with the present invention, the method includes the step of helically winding a second annular wrap of a single filament of bead wrapping wire around the bead core and the first annular wrap in a second direction opposite from the first direction.

In accordance with still another embodiment of the present invention, a vulcanized tire constructed by the process of:

constructing a cable bead by winding a single filament of bead core wire having a coating of rubber or elastomeric material into successive windings in a side by side relation and in successive superimposed rows of predetermined widths to form a bead core of predetermined cross-sectional shape; coating the bead core with a lubricant; and helically winding a first annular wrap of a single filament of bead wrapping wire in a first direction around the coating surrounding the bead core;

setting the cable bead onto a tire ply disposed a building drum with free ends extending outward from the beads;

expanding the building drum so that the cable bead locks the ply in place and turning up the free ends of the ply around the bead so that the coating between the bead core and the annular wrap of bead wrapping wire allows the annular wrap and the ply to slip or rotate with respect to the bead core of the cable bead and return to a desired location once the turnup is completed;

blowing up the carcass into a toroidal shape with the coating about the bead core operating as a lubricant to allow for some movement between the bead core and the annular wrap; and curing the tire in a tire mold so that the lubricant dissolves into the coating of rubber or elastomeric material about the bead core.

Still further in accordance with the present invention, the vulcanized tire is constructed by the process of coating the bead core with a lubricant includes coating the bead core with a fatty acid.

Other objects and advantages of this invention will become readily apparent as the invention is better understood by reference to the accompanying drawings and the detailed description that follows.

BRIEF DESCRIPTION OF THE DRAWINGS

The structure, operation, and advantages of the invention will become further apparent upon consideration of the following description taken in conjunction with the accompanying drawings.

DEFINITIONS

"Axial" or "Axially" means the lines or directions extending parallel to the axis of rotation of a tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Bead Portion" generally means either of the opposed radial inner end portions of the carcass of a tire including a bead, the portion of a ply which is looped about the bead, and the rubber material surrounding the bead and ply portion.

"Carcass" generally means the tire structure including the beads, ply and sidewalls but excluding the belt structure and the undertread disposed over the ply and under the tread.

"Circumferential" means the lines or directions circularly-extending along the perimeter of the surface of the tire tread and perpendicular to the axial direction; or t the lines or directions of a set of adjacent circles whose radii define the curvature of the tire tread as viewed in a transverse cross-section.

"Equatorial Plane" means the imaginary plane extending perpendicular to the axis of rotation of the tire and passing through the center of the tread; or the plane containing the circumferential centerline of the tread.

"Ply" generally means a cord-reinforced layer of rubber-coated, radially deployed material.

"Radial" mean directions extending radially toward or away from the axis of rotation of the tire.

"Sidewall" generally means the radially-extending portion of a tire.

"Single wire" refers to a bead comprised of a single rubber coated wire wrapped into a bundle or hoop of a desired cross sectional shape. The proposed configuration of the bead core is not limited to a hexagonal shape but also includes other shapes such as for example "square" and/or "pentagonal shaped beads.

"Spiral Hex" means a hexagonal shaped bead with an annular wrapping of bead wrapping wire.

DETAILED DESCRIPTION OF THE PREFERRED EMBODIMENT

Construction of a Spiral Hex Bead

Figure 1:
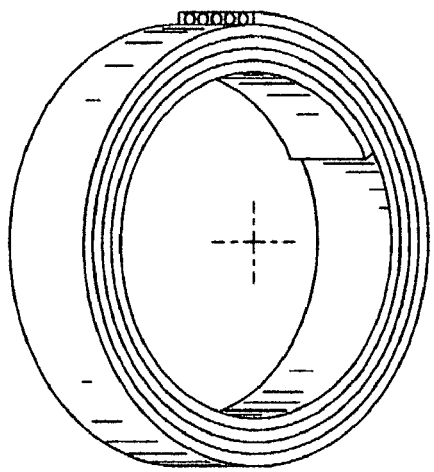
FIG. 1 is a plan view of a prior art strap bead.
Figure 2:
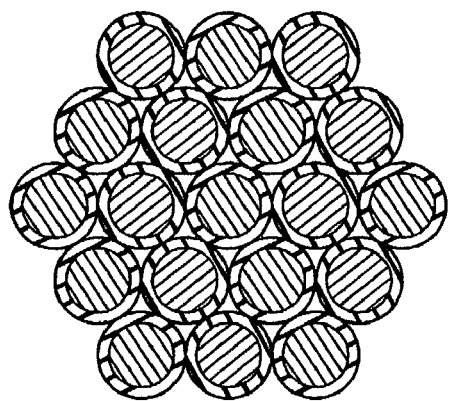
FIG. 2 is a cross-sectional view of a prior art single wire bead.
Figure 3:
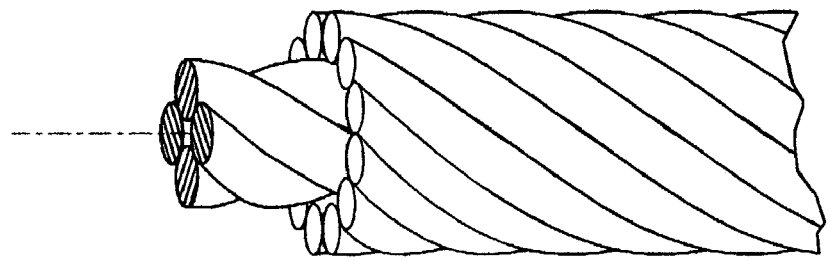
FIG. 3 is a plan view of a prior art cable bead.
Figure 4:
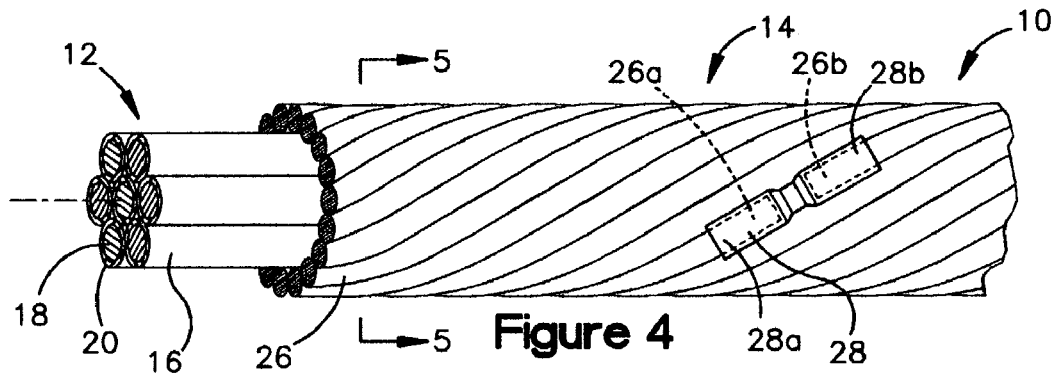
FIG. 4 is an plan view of a spiral hex bead constructed of a single, rubber covered bead core wire wound in side-by-side relation and in successive superimposed layers and wrapped with a layer of bead wrapping wire according to the present invention.

Referring now to the drawings that show several embodiments of the present invention, there is shown in FIG. 4 a side view of a spiral hex bead 10 made according one embodiment to the present invention.

The spiral hex bead 10 includes a bead core 12 and at least a first layer 14 of bead wrapping wire 26 wound around the bead core. The details of the components and method of assembling the components of spiral hex bead 10 are discussed in detail hereinafter.

Bead Core

Referring to FIG. 4, there is illustrated the bead core 12, which is constructed of a plurality of lengths of bead core wire 16. Each bead core wire 16 has a metal core 18 and a coating 20 of rubber or elastomeric material. The bead core 12 is constructed in the same manner that a conventional single wire bead is constructed into a desired cross-sectional shape. That is a length of bead core wire 16 is wound into a plurality of successive superimposed rows 22a,22b,22c, as shown in FIG. 6A, wherein each of the rows has one or more successive windings (1-7). The bead core wire 16 is wound into concentric wraps so that the lengths of wire in each row are substantially parallel to each other. There is one area of the bead core 12 where the bead core wire 16 crosses over between two successive rows.

Figure 6:
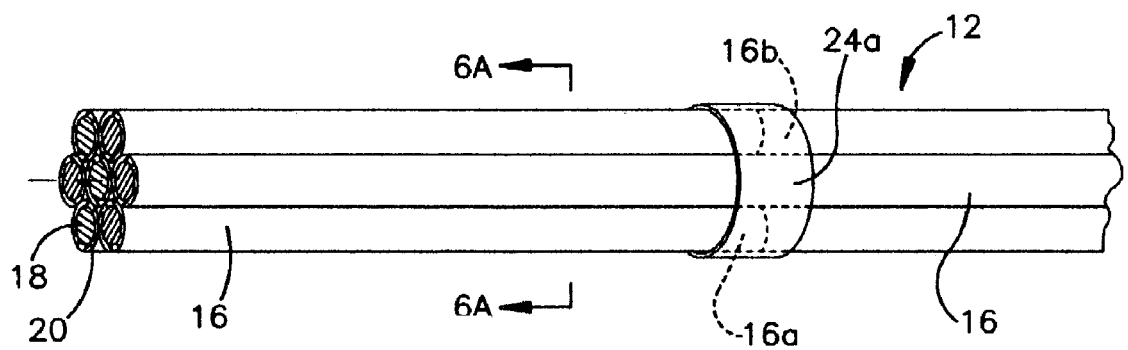
FIG. 6 is a plan view of a portion of a bead core for a spiral hex bead made according to the present invention.
Figure 6A:
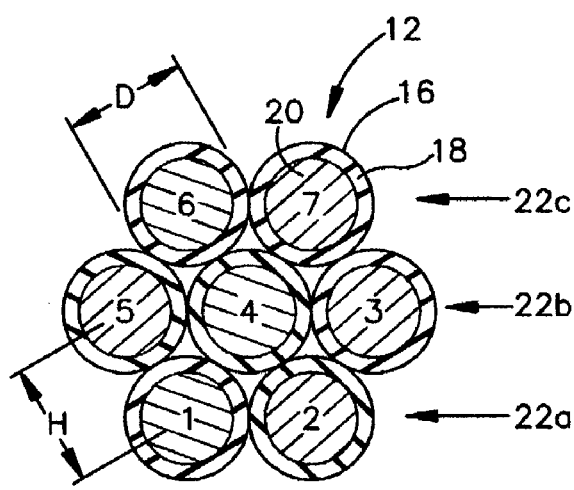
FIG. 6A is a cross sectional view through line 6A-6A of FIG. 6 showing one embodiment of the bead core for a spiral hex bead made according to the present invention.
Figure 6B:
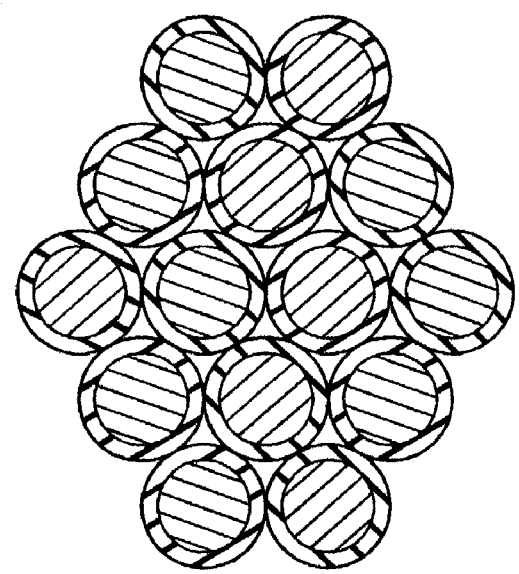
FIG. 6B is a cross sectional view of a bead core for a spiral hex bead having a single bead core wire wound in side-by-side relation and in successive superimposed layers of predetermined widths to provide a bead core of hexagonal cross-sectional shape.
Figure 7:
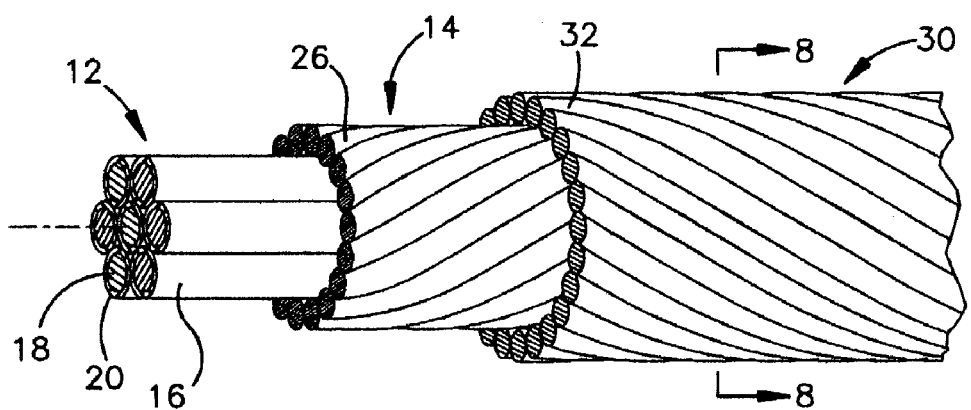
FIG. 7 is a plan view of a spiral hex bead constructed of a single, rubber covered bead core wire wound in side-by-side relation and in successive superimposed layers and wrapped with two layers of bead wrapping wire, each wound in opposite directions from each other, according to the present invention.

As an example and not by way of limitation, FIGS. 6 and 6A show an embodiment of the bead core 12 with a hexagonal cross-sectional shape according to the present invention. The hexagonal shape is a preferable embodiment of the present invention because it most closely approaches a circular cross section which provides the strongest, lowest material requirements, and most efficiently manufactured shape for a bead core 12 of the improved spiral hex bead of the present invention.

Referring to FIG. 6A, there is shown cross-sectional view of the bead core 12 taken along a line indicated by the section marks 6A-6A of FIG. 6. The hexagonal shape of bead core 12 is formed from seven (7) convolutions or windings 1-7 of a bead core wire 16 in three rows, first row 22a, second row 22b and third row 22c. While three rows are shown, it will be obvious to one skilled in the art that the number of rows and the number of windings within each row can be varied to achieve a great variety of cross sectional shapes. Several alternative embodiments are discussed hereinafter.

The order of winding the bead wire 16 is enumerated for each of the windings 1-7. In the winding of the bead core 12, the bead wire 16 is generally placed adjacent to the previous winding in a side-by-side, parallel relationship and as necessary above or radially outward of the previous winding when a new row is started. For example, as shown in FIG. 6A, the second winding 2 of the bead wire 16 is placed next to the first winding 1 forming the first or radially innermost row 22a of the bead core 12. The third winding 3 of the bead wire 16 is placed radially outward and adjacent to the previous winding 2 to begin the second row 22b. This pattern is continued to make a bead core of rows 22a, 22b and 22c of the desired cross-sectional shape or of any number of rows and windings. The windings of bead core wire 16 in each row 22a, 22b or 22c are disposed in concentric relation to each other.

Referring again to FIG. 6, once the bead core 12 has been wound into a circular bundle, the elastomeric coating 20 about the metal core 18 of the bead wire 16, typically of a green rubber, generally keeps the bundle together within the desired, i.e., hexagonal configuration. Still, there are two opposite free ends 16a and 16b of the bead wire 16 that have a tendency to spring free from the bundle of bead wires 16 forming the bead core 12. As is conventionally known, the free ends 16a, 16b of the bead wire 16 can be secured to the bundle of bead wire 16 forming the bead core 12 by a number of techniques including pushing the ends into the bundle and/or stapling or taping the ends to the bundle. As shown in FIG. 6, the free ends 16a and 16b of the bead wire 16 are secured to the bundle forming the bead core 12 by a strip of tape 24a.

Alternative Bead Cores

While the bead core 12 has been described as being constructed of a single-coated bead wire to form a close-packed hoop with a hexagonal cross-section which is made of seven (7) wires as shown in FIGS. 6 and 6A, it is also within the terms of the present invention to form the bead core with a cross section made of up to nineteen bead wires. If the number of wires is less than seven, the cross-sectional shape is not circular enough to provide adequate support for the layered wire 16. If the number of wires is greater than nineteen, the weight of the tire is increased and it becomes more difficult to assemble the tire on a wheel rim.

While the bead core 12 has been described as being formed of a bundle of bead wire 16 with the free ends 16a, 16b of the wire secured to the bundle by a number of techniques, including pushing the ends into the bundle and/or stapling or taping the ends to the bundle, it is also within the terms of the present invention to partially or fully wrap the bead core 12 with a reinforced or non-reinforced material, such as monofil, square, woven fabric. The reinforced or non-reinforced material is intended to be used to secure the free ends 16a, 16b and to further provide ease of rotation of the bead core 12 during the tire building process. As described herein below, the wrapping reinforced or non-reinforced material can be coated with a compatible lubricant such as, but not limited to, a fatty acid, like such as zinc stearate.

While the bead core 12 has been described as being constructed of a single coated bead core wire 16 to form a closely packed hoop with a hexagonal cross-section, it is also within the terms of the present invention to coat such bead core wires with material such as, but not limited to chrome, zinc, copper, bronze or brass.

While the bead core 12 has been described as being constructed of bead core wire 16 coated with uncured rubber to form a closely packed hoop with a hexagonal cross-section, it is also within the terms of the present invention to precure the bead core 12 prior to applying the annular wrap 14 of bead wrapping wire 26, as discussed herein later.

Bead Core Coating

After the bead core 12 is completed, it is coated with a fatty acid, such as zinc stearate or some other compatible lubricant. Typically this is accomplished by dipping the core into the zinc stearate, which is in a powder-like form, and then shaking the excess off. While it is preferable to have the zinc stearate in a resin-like dust form, it could also be in a slurry.

The purpose of the bead core coating is to allow for the rotation or slippage of the tire component material adhered to the annular wrap 14 with respect to the bead core 12 during the building and curing process. During the curing process, the coating on the bead core is absorbed into the rubber and therefore cannot be seen or have an effect on a finished cured tire.

To understand the manufacturing process, where a coating is applied between the bead core 12 and the annular wrap of bead wrapping wire 26, a discussion of the advantage is provided in the discussion of the assembly in a tire carcass below.

Annular Wrap of Bead Wrapping Wires

Figure 5:
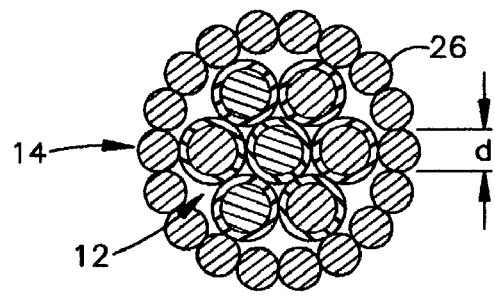
FIG. 5 is a cross-sectional view of an enlarged portion of a spiral hex bead constructed of a single, rubber covered bead core wire wound in side-by-side relation and in successive superimposed layers and wrapped with a non-rubber coated bead wrapping wire according to the present invention.

As shown in FIGS. 4 and 5, the spiral hex bead 10 includes a bead core 12, as previously described, having a first annular wrap 14 of bead wrapping wire 26 formed from a length of bead wrapping wire that is helically wound around the bead core in a first direction. The bead wrapping wire 26 is typically either the same diameter or smaller diameter than the diameter of the bead core wire 12, but is not limited to a wire size restriction. The helical wrapping of the bead wrapping wire 26 around the bead core 12 usually takes several turns or windings around the annulus of the bead core bundle 12 before the core is completely or nearly covered with a single annular wrapping of the bead wrapping wire 26. While the bead wrapping wires 26 are shown in FIG. 4 as being in contact with successive adjacent windings disposed in a side by side relation with each other to completely enclose the bead core 12, it is typical and within the terms of the invention to wind the bead wrapping wires 26 about the bead core so that there is a space between the adjacent bead wrapping wires. After the bead wrapping wire 26 is wound about the bead core 12, the ends 26a, 26b of the bead wrapping wire 26 are inserted into opposite ends 28a and 28b, respectively, of a ferrule 28. Then the ferrule 28 is crimped to secure the free ends 26a, 26b of bead wrapping wire 26 therein to insure that the first annular wrap 14 does not separate.

Alternative Embodiments of Annular Wrap of Bead Wrapping Wires

Figure 8:
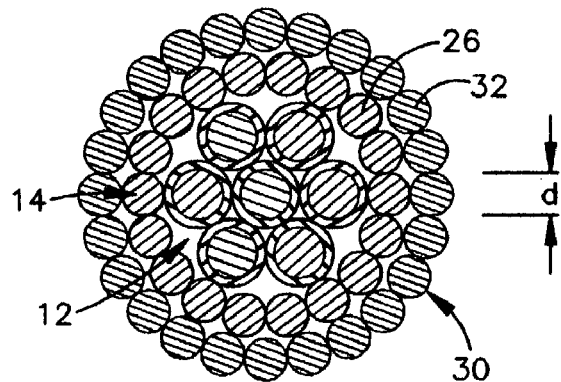
FIG. 8 is a cross sectional view through line 8-8 of FIG. 7.

Referring to FIG. 8, there is shown an alternative embodiment of the present invention wherein a second annular wrap 30 of second bead wrapping wire 32 is formed from a length of second bead wrapping wire that is wrapped or wound around the coated bead core 12 and the first annular wrap 14 of bead wrapping wire 26 in a second direction opposite from the direction of the first annular wrap is wound about the bead core. The free ends (not shown) of the second bead wrapping wire 32 are also connected with a ferule (not shown) in a manner that the opposite free ends 26a, 26b of wrapping wire 26 of the first annular wrapping 14 are connected to each other as previously described. While two annular wrappings 14, 30 of wrapping wire 26, 32 are illustrated herein, it is within the terms of the present invention to add annular wrappings of wrapping wire, each wound in the opposite direction from the annular wrapping of wrapping wire directly there under.

While each of the annular wrappings are preferably wound in the opposite direction from the annular wrappings of wrapping wire or the core bead wire directly there under, it is also within the scope of the invention to wind the annular wrappings of wire in the same direction as the annular wrapping or core located directly there under.

While the spiral hex bead 10 has been described as having an annular wrap of bead wrapping wire 14 formed from a length of wire 26 that is helically wound around the coated bead core 12, it is also within the terms of the present invention to allow for rubber coating of the first annular wrap 14 of bead wrapping wire 26 and/or the second annular wrap 30 of bead wrapping wire 32.

While the spiral hex bead 10 has been described as having a layer or layers of non-rubber coated wire 14 formed from a length of wire 26 that is helically wound around the coated bead core 12, it is also within the terms of the present invention to coat such wires with material such as, but not limited to, chrome, zinc, copper, bronze or brass.

It can be understood that the spiral hex bead 10 of the present invention can be assembled with bead core wire 12 and bead wrapping wire 14 that are of different metals and/or coated with different materials to affect the operating characteristics of the spiral hex bead depending on the design parameters.

Assembly in Tire Carcass

Figure 9:
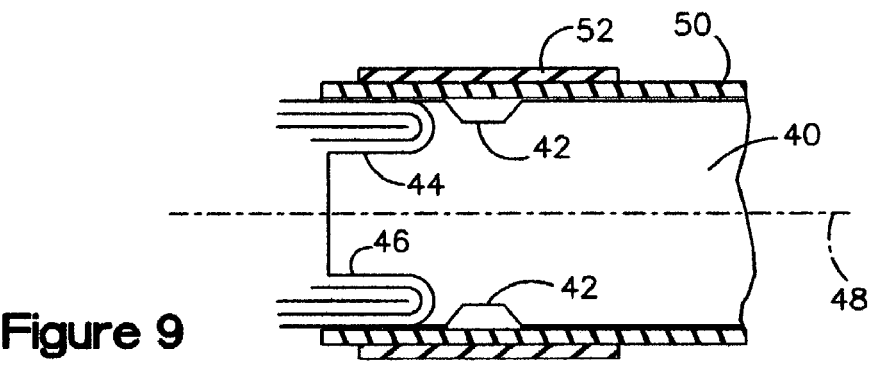
FIG. 9 is a cross-sectional view of a tire building drum with a ply and apex in place.
Figure 10:
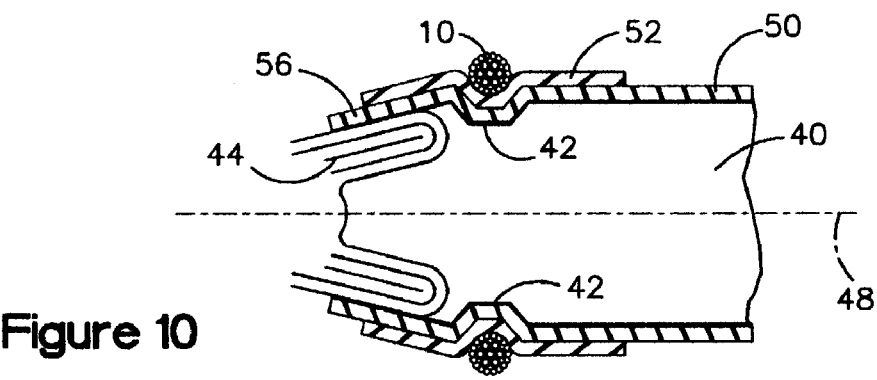
FIG. 10 is a cross-sectional view of a tire building drum with the ply turned down and a spiral hex bead placed onto the ply and apex.
Figure 11:
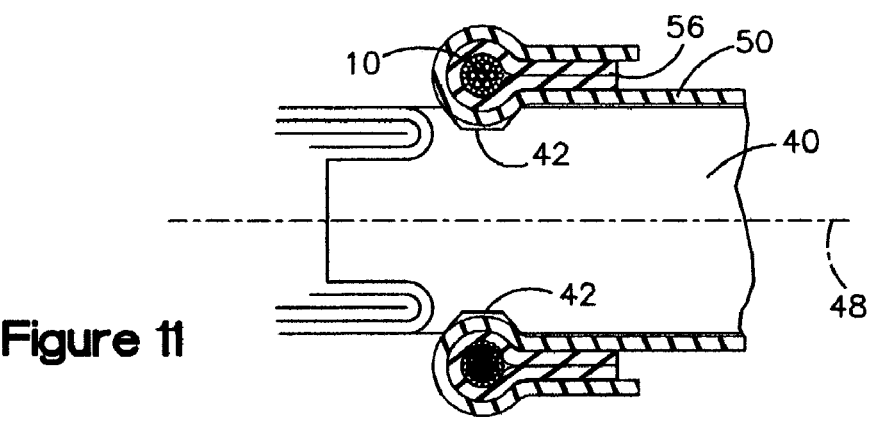
FIG. 11 is a cross-sectional view of a tire building drum with a ply and spiral hex bead disposed in the bead pocket.

Referring to FIG. 9, there is illustrated a conventional building drum 40 having pockets 42 to receive the spiral hex beads and a turn-up bladder 44, which is disposed about the circumference of the outer ends 46 of the building drum. As shown in FIG. 9, the outer circumferential surface 46 of the building drum 40 has a tire ply 50 extending between the ends of the building drum. Also, conventional components, such as but not limited to an apex 52, are applied to the building drum 40. Then, as shown in FIG. 10, the turn-up bladder 44 projects radially inward from the centerline 48 of the building drum 40 so that the ply ends 56 are turned down about 20 degrees. Next, the spiral hex bead 10 is moved into place by a bead setter (not shown). The spiral hex bead 10 is set over the tire components, such as the apex 52, so that the spiral hex bead is aligned over the pocket 42. Then, when the building drum 40 is expanded (not shown), the spiral hex bead 10 locks the ply 50 and apex 52 into the bead pocket 42. Next, the ends of the free ends of the ply are turned up around the spiral hex bead, as shown in FIG. 11. During this latter step, the coating between the bead core 12 and the annular wrap(s) 14, 30 of bead wrapping wire allows the annular wraps, the ply 50 and apex 52 (if present) to slip with respect to the bead core 12 of spiral hex bead 10. Besides the annular wrap(s) 14,30 being able to move during turnup, they can also return to a desired location once the turnup is completed because they are generally not constructed of coated wire. Also, the coating about the core can still operate as a lubricant to allow for some movement between the bead core 12 and the annular wrap(s) 14, 30. Another advantage of the present invention is that the absence of the rubber on the outer wrapping layer allows the ply to move across the outer layer without twisting the outer layer. Then, as is conventionally known, the carcass is blown up into the toroidal shape. Thus the construction of spiral hex bead 10 allows the bead to nest into the bead pocket 42 without causing distortion of the tire ply 50 and apex 52 because the ply and apex can adjust itself by slipping with respect to the coated bead core 12.

Then, the green tire is removed from the building drum 40 and placed into a curing mold (not shown). As is conventionally know, high pressure gas (about 300 psi) and steam are introduced into the tire to force it outward against the mold walls. In the past, the bead wires of a single wire bead would sometimes become distorted because they could not move when the tire was mounted onto the mold ring. This caused a kink in the bead, which caused a defect in the final tire. However, with the coated bead core of the present invention, the outer wraps are still able to move with respect to the bead core when the green tire is positioned within the mold and thereby there is no distortion in the bead. This is an important advantage of the present invention, which results from the addition of a lubricant coating, such as zinc stearate, to the bead core. Next, during the curing process, the coating, typically of zinc stearate, gets absorbed into the final rubber of the bead. That is, the rubber about the bead penetrates through the annular wraps 14, 30 toward the bead core 12 so that the annular wraps and bead core form a solid hoop in the exact location without any kinks or otherwise undesired stresses caused by the manufacturing process.

Spiral Hex Bead Construction in Vulcanized tire

Figure 12:
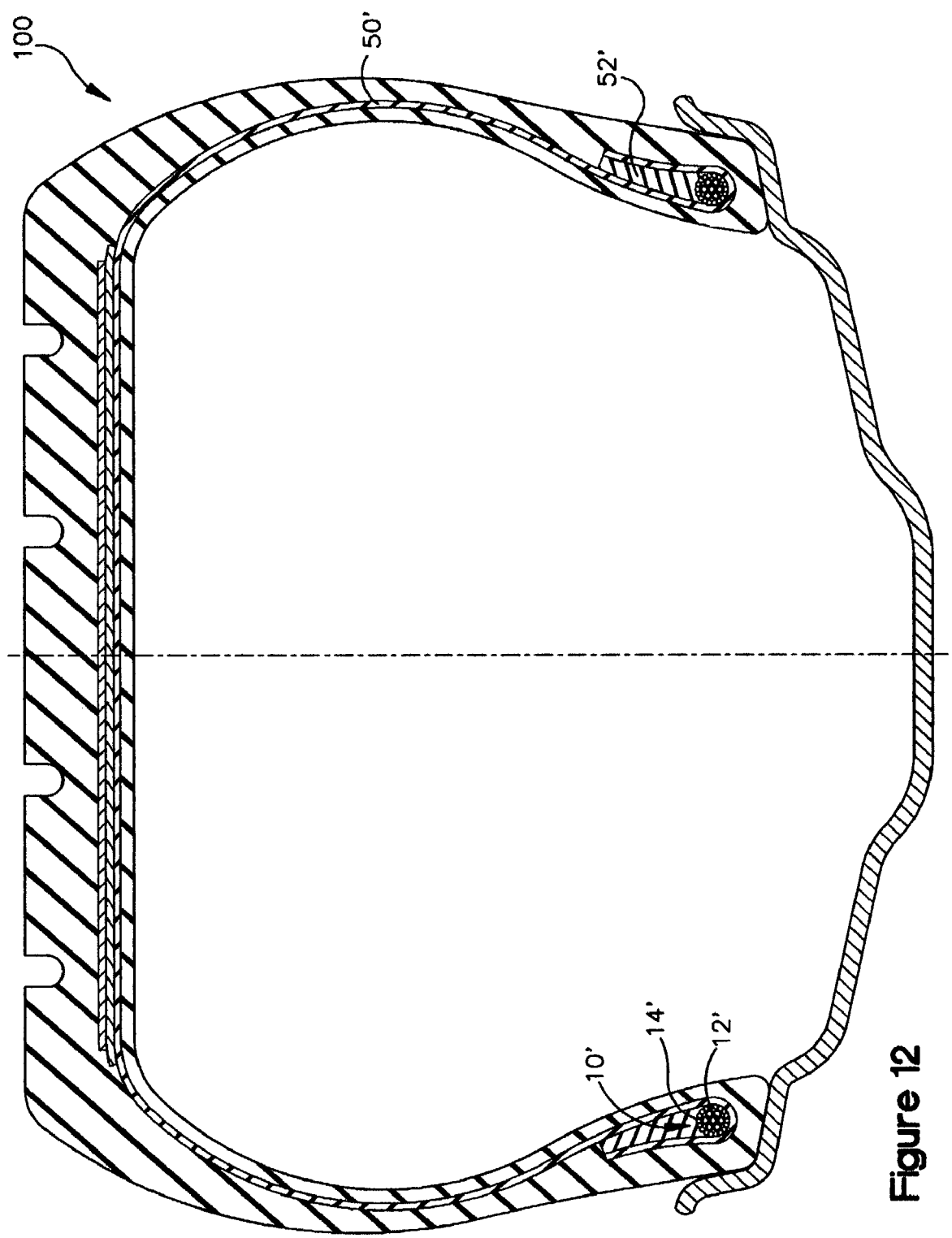
FIG. 12 is a cross-sectional view of a tire incorporating a spiral hex bead according to the present invention.
Figure 13:
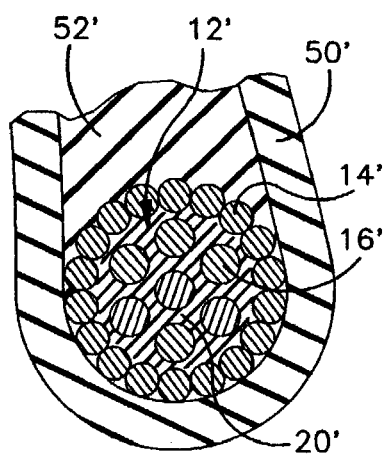
FIG. 13 is an enlarged view of the spiral hex bead as shown in FIG. 12.
Figure 14A:
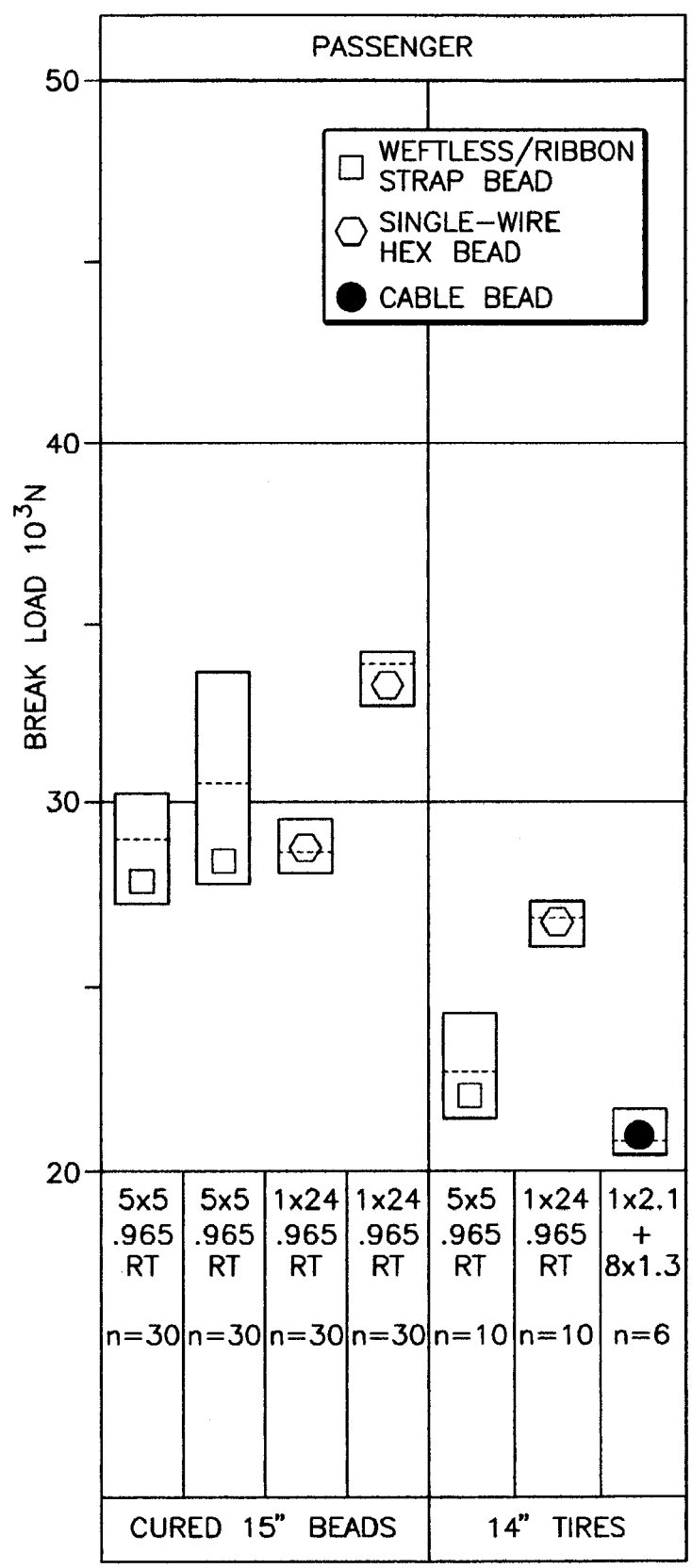
FIGS. 14A and 14B, collectively identified as FIG. 14, are tables showing the strength of various bead types.
Figure 14B:
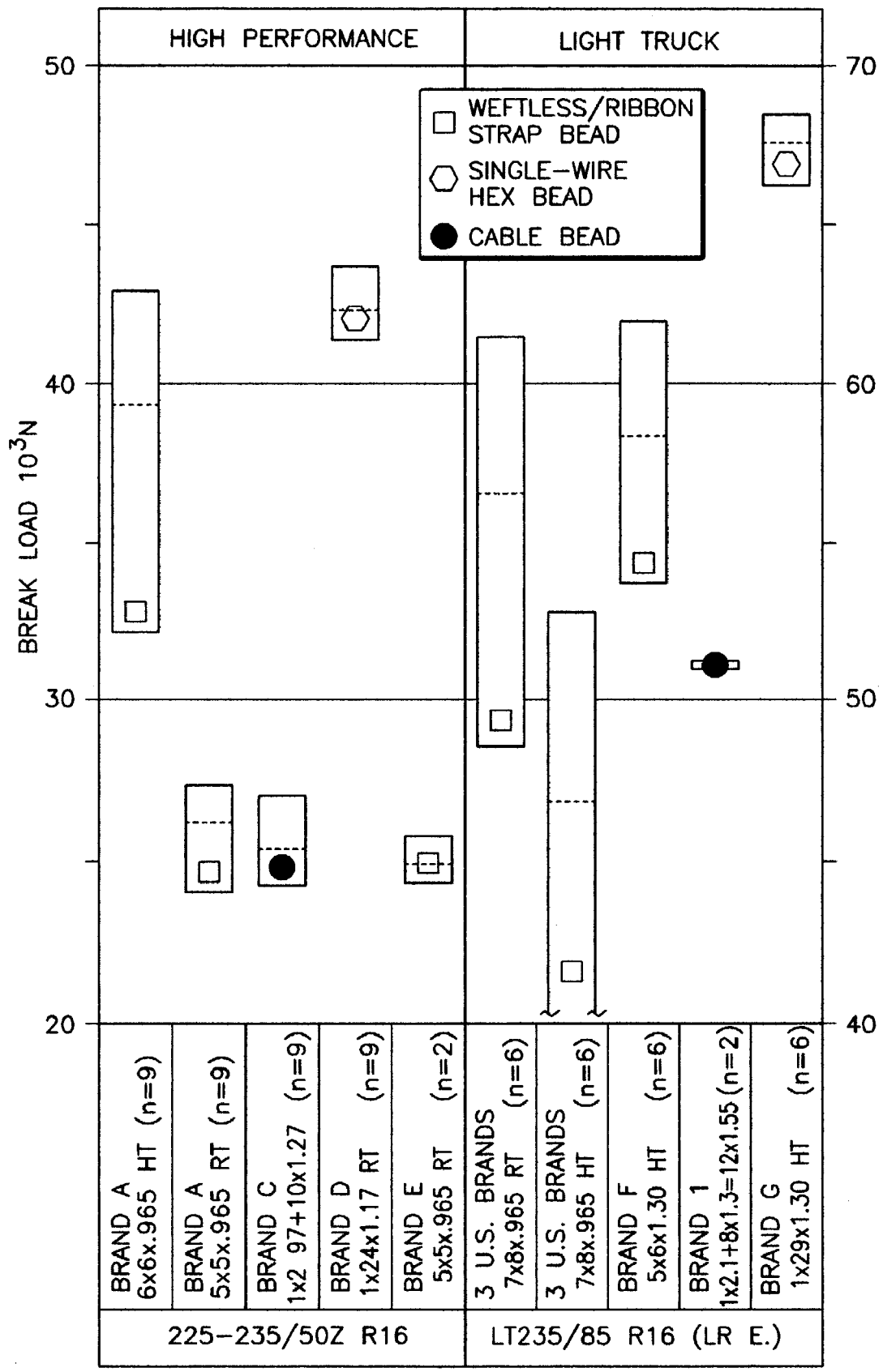

Referring to FIG. 12, there is shown an illustration of a typical vulcanized tire 100 incorporating a spiral hex bead 10' constructed of a bead core 12' and a wire layer 14'. Primed numerals represent elements that are substantially identical to elements having the same but unprimed number. The tire bead core 12' subsequent to vulcanization, as shown in FIG. 13, has a hexagon shaped cross-section of core wires 16', which are embedded in a vulcanized rubber coating 20' and surrounded by an annular wire wrap 14'. The spiral hex bead 10' is surrounded with a tire ply 50' and apex 52'. When the tire 100 is constructed with a spiral hex bead 10' of the type described herein, it is much stronger than comparable prior art ribbon beads, single wire beads or cable beads. For example, the breaking load of comparable cured 14, 15 and 16 inch beads reflect the higher breaking strength of single wire type beads versus strap and cable beads. The table as shown in FIGS. 14A, 14B, collectively called FIG. 14, derived from "An Overview of Mechanical Characteristics of Various Tire Bead Types" by National Standard, dated May 1997, displays the various bead type strengths.

Figure 15:
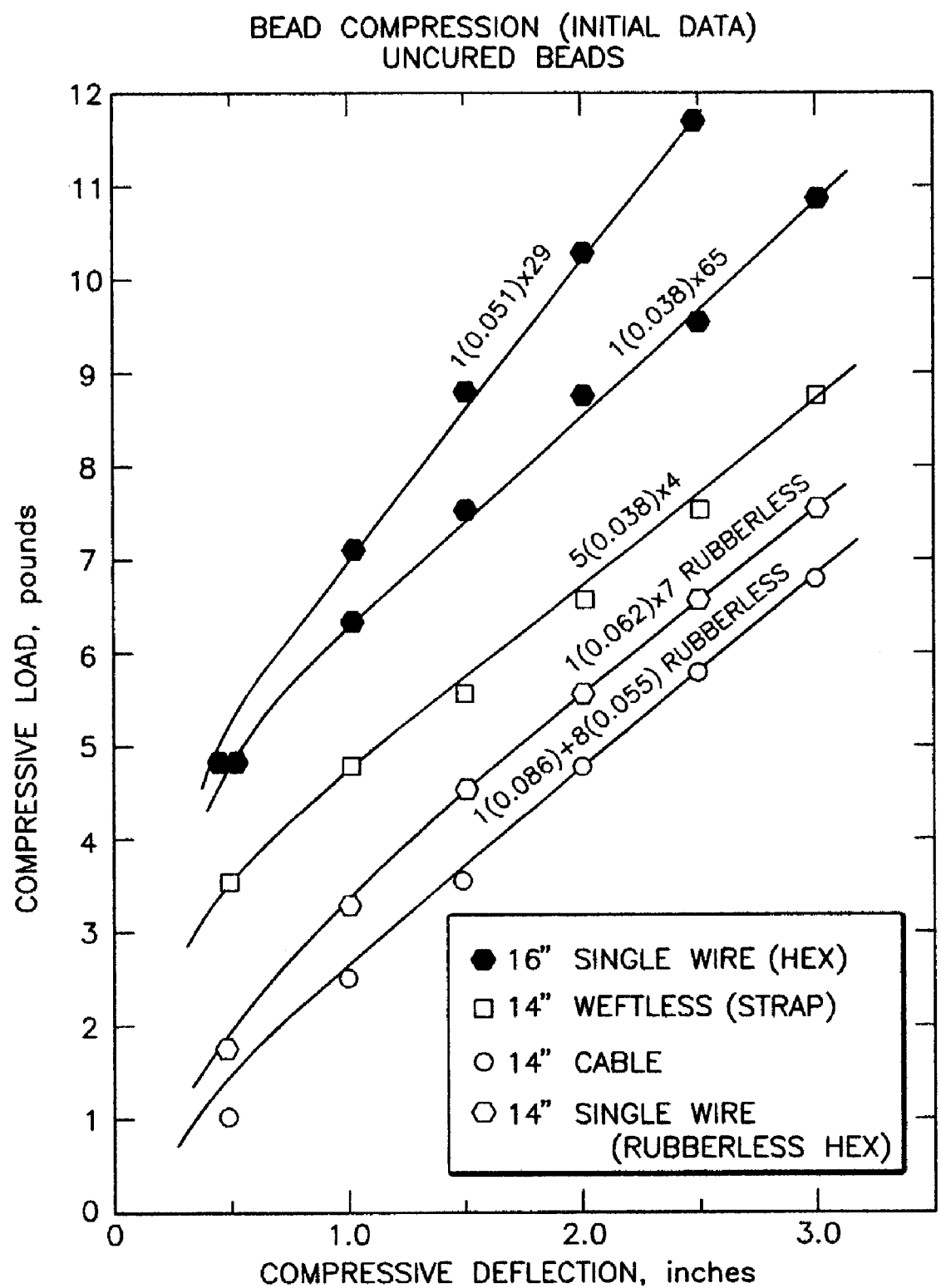
FIG. 15 is a table that displays the bead compressions for various types of tire beads.

In a completed tire 100, the bead core 12' is able to move with respect to the annular wrapping layer 14'. In fact, the strength of the spiral hex bead 10' is provided by the bead core 12'. The annular wrapping layer 14' primarily provides a means for separating the bead core 12' from the surrounding tire components, such as the tire ply 50' or the tire component(s) between the ply turnup end and the remainder of the tire ply. The annular wrapping layer 14' allows the tire bead portions of the tire to remain seated on the tire rim under heavy loading, such as during underpressurized or no pressure operation. For example, the bead compression of comparable 14 inch beads reflect the lower compression deflection of single wire tire beads versus strap and cable beads. The table of FIG. 15, derived from "Update of Bead Materials-Design Observations" by National Standard, dated May 1992 addition, displays the various bead type bead compression.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A bead core for a tire comprising:
    a bead core bundle formed by winding a bead core wire having a coating of uncured elastomeric material into successive windings;
    at least one annular wrap of a single filament of bead wrapping wire helically wound around the bead core bundle in a first direction;
    and a lubricant disposed between the bead core bundle and the at least one annular wrap to allow for rotation or slippage of a tire component material adhered to the annular wrap with respect to the bead core bundle.

2. The bead core as set forth in claim 1 wherein the lubricant is a fatty acid.

3. The bead core as set forth in claim 2 wherein the fatty acid is a zinc stearate.

4. The bead core as set forth in claim 1 wherein the coating of uncured elastomeric material comprises uncured rubber.

5. The bead core as set forth in claim 1 wherein the bead core bundle has a hexagonal cross-sectional shape.

6. The bead core as set forth in claim 1 further comprising a second annular wrap of bead wrapping wire helically wound around the first annular wrap of bead wrapping wire in a second direction opposite from the first direction.

7. The bead core as set forth in claim 1 wherein the bead core wire comprises a coating of a material selected from the group consisting of chrome, zinc, copper, bronze and brass.

8. The bead core as set forth in claim 1 wherein the bead wrapping wire comprises a coating of a material selected from the group consisting of chrome, zinc, copper, bronze and brass.

9. The bead core as set forth in claim 1 wherein the bead core wire and the bead wrapping wire being of different metals and/or coated with different materials to affect an operating characteristic of the bead core.

10. The bead core as set forth in claim 1, wherein the bead core bundle comprises a single filament of bead core wire which is constructed by wrapping a single strand of rubber coated bead core wire into the bead core bundle.

11. The bead core as set forth in claim 1, wherein the bead core bundle has a cross-section of at least seven and up to nineteen bead wires.

12. The bead core as set forth in claim 1, wherein free ends of the bead core wire are secured to the bundle by a technique selected from the group consisting of by pushing the ends into the bundle, by stapling the ends to the bundle, by taping the ends to the bundle, by a strip of tape and by at least partially wrapping the bead core bundle with a reinforced or non-reinforced material to secure the ends of the bead core wire.

13. The bead core as set forth in claim 1 wherein the lubricant is in a powder form.

14. A method of constructing a cable bead by the steps of:
   winding a single filament of bead core wire having a coating of uncured rubber or elastomeric material into successive windings in a side by side relation and in successive superimposed rows of predetermined widths to form a bead core of predetermined cross-sectional shape;
   coating the bead core with a lubricant; and
   after coating the bead core with a lubricant, helically winding a first annular wrap of a single filament of bead wrapping wire in a first direction around the lubricant coating surrounding the bead core, the lubricant adapted to allow for rotation or slippage of a tire component material adhered to the annular wrap with respect to the bead core.

15. The method of claim 14 wherein the step of coating the bead core with a lubricant includes coating the bead core with a fatty acid in a powder form.

16. The method of claim 15 wherein tho step of coating the bead core includes coating the bead core with a zinc stearate in a powder form.

17. The method of claim 14 further including the step of helically winding a second annular wrap of a single filament of bead wrapping wire around the bead core and the first annular wrap in a second direction opposite from the first direction.

18. A vulcanized tire constructed by the process of:
   constructing a cable bead by winding a single filament of bead core wire having a coating of uncured rubber or elastomeric material into successive windings in a side by side relation and in successive superimposed rows of predetermined widths to form a bead core of predetermined cross-sectional shape;
   coating the bead core with a lubricant; and
   after coating the bead core, helically winding a first annular wrap of a single filament of bead wrapping wire in a first direction around the coating surrounding the bead core;
   setting the cable bead onto a tire ply disposed about a building drum with free ends extending outward from the beads;
   expanding the building drum so that the cable bead locks the ply in place and turning up the free ends of the ply around the bead so that the lubricant coating between the bead core and the annular wrap of bead wrapping wire allows the annular wrap and the ply adhered to the annular wrap to slip or rotate with respect to the bead core of the cable bead and return to a desired location once the turnup is completed;
   blowing up the carcass into a toroidal shape with the coating about the bead core operating as a lubricant to allow for some movement between the bead core and the annular wrap; and
   curing the tire in a tire mold so that the lubricant dissolves into the coating of rubber or elastomeric material about the bead core.

19. The vulcanized tire constructed by the process of claim 18 wherein the step of coating the bead core with a lubricant includes coating the bead core with a fatty acid.

20. The vulcanized tire constructed by the process of claim 18 wherein the lubricant is in a powder form.

* * * * *